United States Patent [19]

Noguchi et al.

[11] 4,074,661
[45] Feb. 21, 1978

[54] FUEL REFORMING SYSTEM FOR AN INTERNAL COMBUSTION ENGINE

[75] Inventors: Masaaki Noguchi, Nagoya; Tsuchio Bunda, Okazaki; Taro Tanaka, Chiryu, all of Japan

[73] Assignee: Nippon Soken, Inc., Nishio, Japan

[21] Appl. No.: 657,289

[22] Filed: Feb. 11, 1976

[30] Foreign Application Priority Data

Feb. 14, 1975  Japan ............................. 50-19229

[51] Int. Cl.² ............................................. F02B 43/08
[52] U.S. Cl. ...................................... 123/3; 123/32 ST
[58] Field of Search ................ 123/3, 32 ST, 1 A; 48/116, 117, 144, 212, 213, 219

[56] References Cited

U.S. PATENT DOCUMENTS

| 3,635,200 | 1/1972 | Rundell et al. | 123/3 |
| 3,734,473 | 5/1973 | Moriya et al. | 261/44 R |
| 3,754,870 | 8/1973 | Carnaman et al. | 123/3 |
| 3,809,039 | 5/1974 | Alquist | 123/32 ST |
| 3,828,736 | 8/1974 | Koch | 123/3 |
| 3,901,197 | 8/1975 | Noguchi et al. | 123/3 |
| 3,955,538 | 5/1976 | Noguchi et al. | 123/3 |
| 3,977,366 | 8/1976 | Yamaguchi et al. | 123/3 |
| 4,023,539 | 5/1977 | Noguchi et al. | 123/3 |
| 4,026,248 | 5/1977 | Lee et al. | 123/3 |
| 4,036,180 | 7/1977 | Noguchi et al. | 123/3 |

Primary Examiner—Ronald H. Lazarus
Assistant Examiner—Craig R. Feinberg
Attorney, Agent, or Firm—Cushman, Darby & Cushman

[57] ABSTRACT

A system for converting a rich air-fuel mixture into a reformed gaseous mixture containing hydrogen forms a part of an intake system of an internal combustion engine. The system includes an intake passage divided by a dividing wall into a first and a second sub-passages for receiving relatively lean and rich parts of the rich air-fuel mixture, respectively. The first sub-passage has a sparking plug for igniting and burning the relatively lean part of the mixture to produce heat which is transferred by the dividing wall and, as occasion demands, by a heat exchanger to the relatively rich part of the mixture flowing through the second sub-passage in order that a part of the fuel is converted into reformed gaseous mixture and the remainder of the fuel is effectively vaporized. Thereafter the rich air-fuel mixture is directed to a catalyst bed disposed downstream of the first and the second sub-passages and subjected to the fuel reformation operation, wherein the fully vaporized fuel is completely converted into reformed gaseous mixture. The sub-passages and the catalyst bed are disposed in the system upstream of a throttle valve, whereby the system is protected from variation in the vacuum produced in the intake system of the engine and thus is reliably operative to produce the reformed gaseous mixture.

10 Claims, 16 Drawing Figures

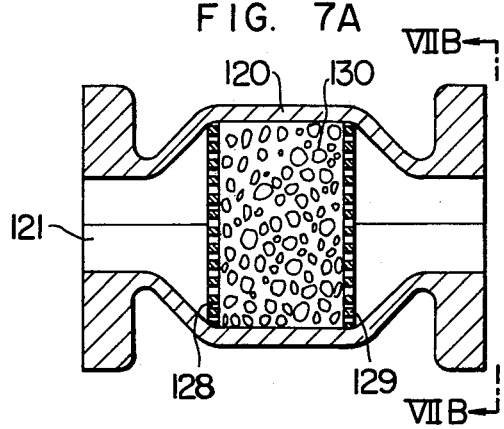
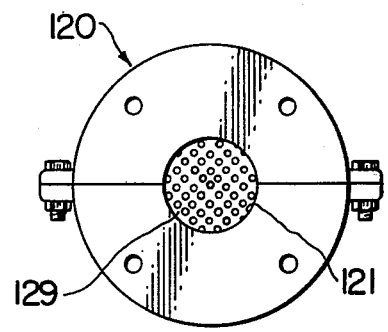
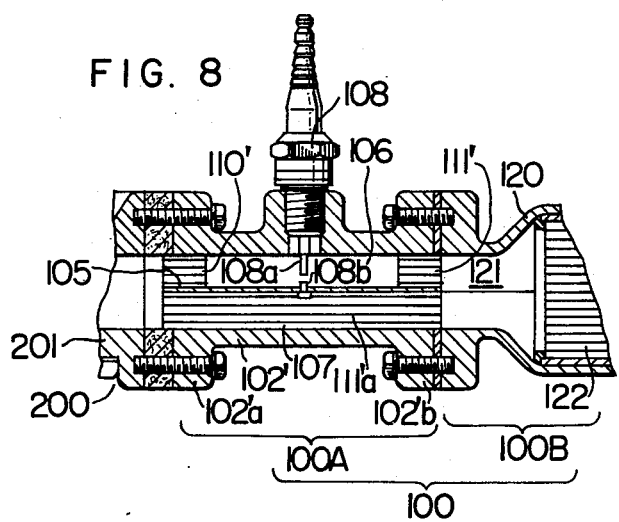
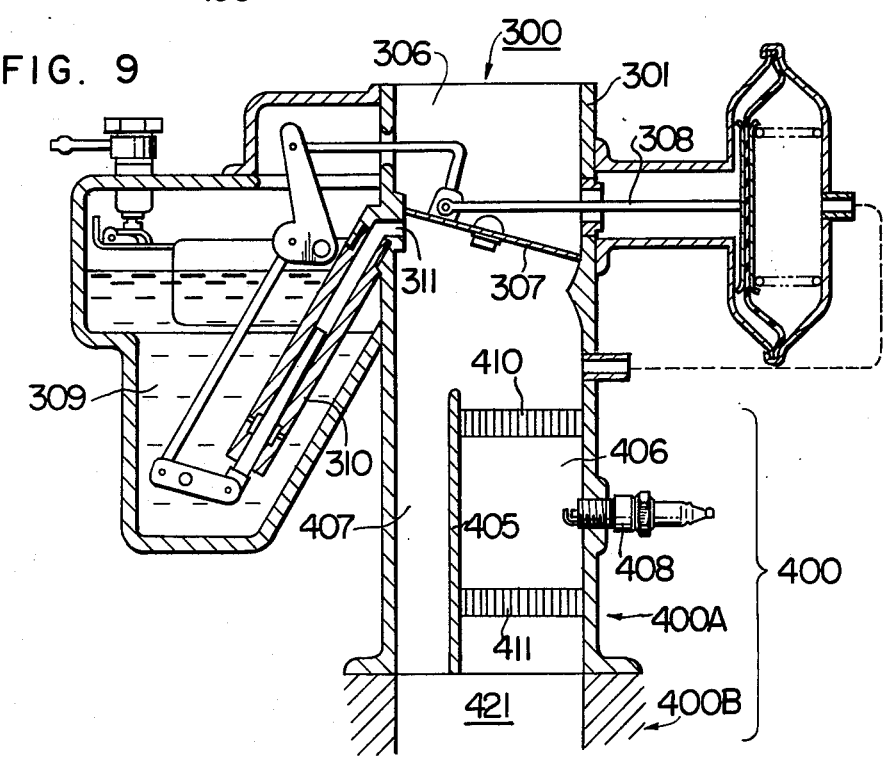

FUEL REFORMING SYSTEM FOR AN INTERNAL COMBUSTION ENGINE

BACKGROUND OF THE INVENTION

1. Field of the Invention

The present invention relates generally to an internal combustion engine operable with a mixture of air and a fuel such as a hydrocarbon fuel (for example, gasoline) or alchols (for example, methyl alchol) and, more particularly, to a fuel reforming system for converting a rich mixture of air and the fuel into an easily combustible reformed gaseous mixture containing hydrogen and for feeding the reformed gaseous mixture into a combustion chamber of the engine for the combustion therein to thereby reduce the emission of the harmful components of the engine exhaust gases and improve the fuel consumption of the engine.

2. Description of the Prior Art

In order to comply with the requirements for the purification of engine exhaust gases, it has recently been strongly demanded that a mixture of air and a fuel to be supplied into an engine is uniformly distributed to respective cylinders and that the ignitability and combustibility of the mixture in combustion chambers are improved.

In the past, in an attempt to comply with the demands discussed above, there has been proposed an apparatus for heating an intake system of an engine by engine exhaust gases or warmed engine cooling water to facilitate the atomization of fuel in the intake system. With the proposed prior art apparatus, however, the atomization of fuel depends upon the temperature of the engine exhaust gases or cooling water with the resultant disadvantage that it is difficult to obtain sufficient atomization of fuel over all ranges of the operating conditions of the engine. In addition, the prior art apparatus has improved the ignitability and combustibility of fuel only to the extent that is achieved by mere atomization of the fuel and, thus, has not completely satisfied the requirements. References will be made hereunder to examples of the prior art apparatus.

U.S. Pat. No. 1,687,918 issued Oct. 16, 1928 to L. M. Woolson discloses a heater disposed in an intake system of an internal combustion engine downstream of a carburetor to heat an air-fuel mixture produced thereby. The heater includes a sparking plug for igniting and burning a part of a fuel to produce heat which is transferred through a corrugated wall to the air-fuel mixture flowing through an intake pipe from the carburetor. The heater is disposed in the intake system downstream of a throttle valve which is disposed in the intake system downstream of the carburetor. The combustion of the part of the fuel in a combustion chamber of the heater, however, is disadvantageously influenced by the variation in the vacuum produced by the engine in the intake system. In addition, the heater needs secondary air to be mixed with the part of the fuel to be burnt in the combustion chamber of the heater. The flow of the secondary air into the combustion chamber is controlled by a spring controlled automatic valve to control the combustion of the fuel in the combustion chamber.

U.S. Pat. No. 2,401,862 issued June 11, 1946 to J. J. Dugas discloses a fuel heating system intended to adapt a carburetor to use heavy oil. The system comprises a heater which is disposed outside an intake system of an internal combustion engine and in which fuel is burnt to produce combustion gases which are caused to flow first through a first coil of tube disposed in the intake system downstream of the carburetor and then through a second coil of tube disposed in a float chamber. The heat produced by the combustion is utilized merely to reduce the viscosity of the oil in the float chamber and vaporize an air-fuel mixture produced by the carburetor.

U.S. Pat. No. 3,828,736 issued Aug. 13, 1974 to Christian Koch discloses method and apparatus for the combustion of a fuel. By the method, air and engine exhaust gases are mixed with a fuel to form a mixture which is then passed over a catalyst bed so that the mixture is converted into a gaseous mixture of methan and carbon monoxide which mixture is then fed into an internal combustion engine. The apparatus may include ignition means disposed at the inlet portion of the catalyst bed to heat the catalyst.

In general, internal combustion engines need fuels of high octane values in order to produce high output. For this reason, each of the conventionally used fuels contains an appropriate amount of aromatic hydrocarbon and lead compound which are known to produce harmful compounds and thus give rise to environmental pollution. Thus, smooth operation of internal combustion engines with low octane value fuels has long been desired but not yet attained before the present invention.

SUMMARY OF THE INVENTION

In order to solve the problems discussed above, the present invention aims to provide a fuel reforming system for converting a rich mixture of air and a fuel such as a hydrocarbon fuel (for example, gasoline) or alchols (for example, methyl alchol) into a reformed gaseous mixture most suitable for the uniform distribution of the air-fuel mixture to respective engine cylinders as well as for the improvement in the ignitability and combustibility of the air-fuel mixture and to install the system in the intake system of the engine.

The fuel reforming system according to the present invention is operative to produce a reformed gaseous mixture the main component of which is hydrogen and which includes carbon monoxide and an atomized part of a fuel. The system includes means for producing a heterogeneous rich mixture of air and the fuel preferably at an air-to-fuel ratio of less than 10. The rich air-fuel mixture producing means may preferably be a variable venturi type carburetor which is connected by an intake passage to a secondary intake port of an associated internal combustion engine. A part of the intake passage is divided by a dividing wall into a first and a second sub-passages. A relatively lean part of the rich air-fuel mixture is separated from a relatively rich part of the rich air-fuel mixture and introduced into one of the sub-passages in which the lean part of the rich air-fuel mixture is ignited and burnt by means of an igniting means such as a sparking plug to produce heat which is preferably transferred by the dividing wall and, as occasion demands, by a heat exchanger to the relatively rich part of the rich air-fuel mixture flowing into and through the other sub-passage. Mainly due to the heat produced by the combustion of the relatively lean part of the rich air-fuel mixture in the one sub-passage, the rich part of the the rich air-fuel mixture is subjected to combustion, oxidation, thermal decomposition, atomization or a combination of them and thus is converted into the reformed gaseous mixture mentioned above. A catalyst bed is disposed in the intake passage downstream of the dividing wall to facilitate the reforming conversion. The divided part of the intake passage forms a combustion reaction section of the system of the invention, while the part of the intake passage in which the catalyst bed is disposed forms a catalytic reaction section of the system. Both sections of the system are disposed upstream of a throttle valve disposed upstream of the secondary intake port of the engine so that the reforming reaction in the combustion and catalytic reaction sections is effectively protected from the variation in the vacuum produced by the engine in the intake passage. The combustion and catalytic reaction sections may be covered with layers of a heat insulating material to much facilitate the reforming reaction in the sections.

The reformed gaseous mixture thus produced by the fuel reforming system of the invention may be supplied solely or together with air or mixture of air and a fuel into a combustion chamber or chambers of an ordinary internal combustion engine or into a sub-combustion chamber or chambers of a stratified charge internal combustion engine. In the case where the engine has a plurality of combustion chambers, the reformed gaseous mixture is uniformly distributed to all combustion chambers because the reformed gaseous mixture is prefectly gasified. The hydrogen contained in the reformed gaseous mixture greatly contributes to the improvement in the ignitability and combustibility of the air-fuel mixture in the combustion chamber. In addition, a fuel of a low octane value can advantageously be reformed into a high octane value fuel.

The term "rich air-fuel mixture" used in the present application means an air-fuel mixture which contains a larger percentage of fuel compared with another air-fuel mixture of a stoichiometrically proper air-to-fuel ratio at which a perfect combustion can be produced whereas the term "lean air-fuel mixture" used herein means an air-fuel mixture which contains a lesser percentage of fuel compared with the other air-fuel mixture.

The above and other objects, features and advantages of the present invention will be made apparent by the following description with reference to the accompanying drawings.

BRIEF DESCRIPTION OF THE DRAWINGS

FIG. 7A is an axially sectional view of a further modification of the catalytic reaction section;

FIG. 7B is an end view of the further modified catalytic reaction section shown in FIG. 7A as viewed from line VIIB—VIIB in FIG. 7A;

FIG. 8 is a fragmentary axially sectional view of a modification of a fuel reforming device shown in FIG. 2; and FIG. 9 is a vertical sectional view of another embodiment of the fuel reforming system of the invention.

DESCRIPTION OF PREFERRED EMBODIMENTS

Figure 1:
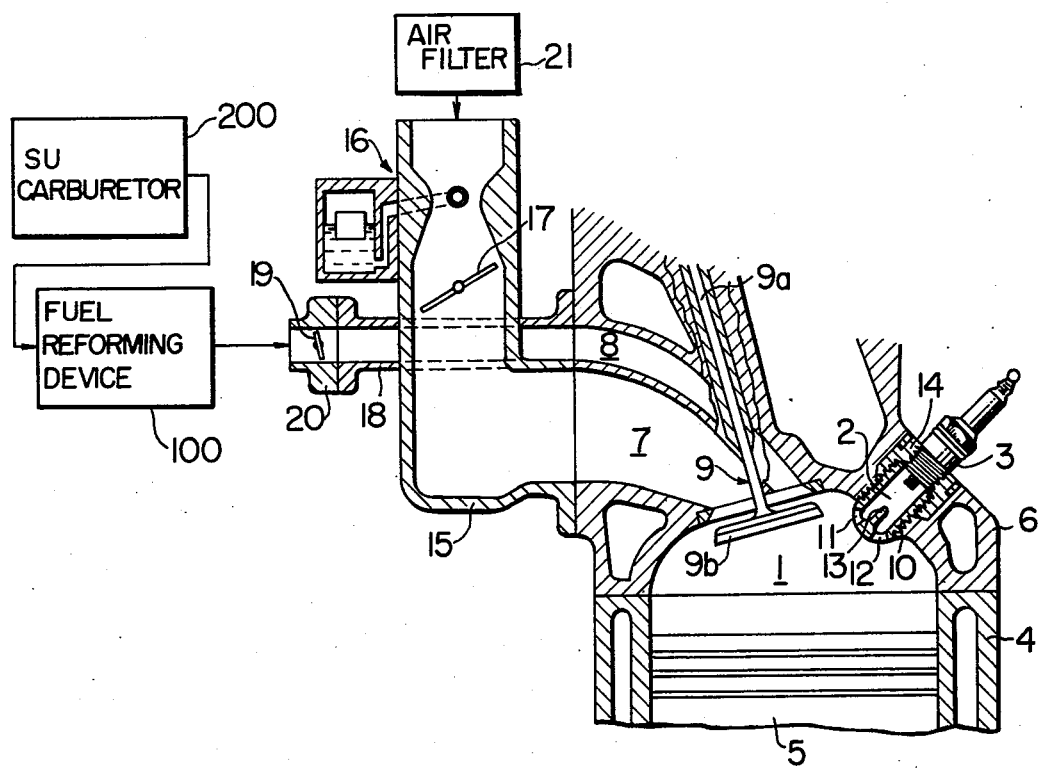
FIG. 1 is a partly diagrammatic and partly sectional side view of an internal combustion engine equipped with a fuel reforming system according to the present invention.

Referring to FIG. 1, an embodiment of the fuel reforming system according to the present invention is shown as being mounted on an internal combustion engine which is of the type including a combustion chamber comprising a main combustion chamber 1 and a sub-combustion chamber in the form of a trap chamber 2 and a sparking plug 3 which has electrodes disposed in the trap chamber 2 and which is of the type used to ignite an ordinary air-fuel mixture. The main combustion chamber 1 is defined by a cylinder 4, a piston 5 reciprocally mounted therein and a cylinder head 6 mounted on the top of the cylinder 4. A main and a secondary intake ports 7 and 8 are formed in and extend through the cylinder head 6 and are connected to the main combustion chamber 1. The secondary intake port 8 has a downstream end opening in the downstream end of the main intake port 7. The communication between the main and secondary intake ports 7 and 8 and the main combustion chamber 1 is controlled by a common intake valve 9 having a valve stem 9a and a valve head 9b and adapted to be actuated by a valve train (not shown). The trap chamber 2 is defined in a cup body 10 mounted in the cylinder head 6 so that the bottom portion of the cup body 10 extends into the main combustion chamber 1. The trap chamber 2 is provided with a suction and a discharge apertures 11 and 12 formed in the bottom portion of the cup body 10 for communicating the interior of the trap chamber 2 with the main combustion chamber 1. The suction aperture 11 is directed substantially to the downstream end of the secondary intake port 8 so that a reformed, gaseous mixture (to be described later) supplied through the secondary intake port 8 flows from the open end thereof into a portion of the main combustion chamber, from which portion the reformed gaseous mixture is introduced by the suction aperture 11 into the trap chamber 2. The trap chamber 2 is also provided with a partition 13 projecting a distance toward the electrodes of the sparking plug 3 from the bottom portion of the cup body 10 between the suction and the discharge apertures 11 and 12 to partially divide the interior of the trap chamber 2. The cup body 10 is secured to the cylinder head 6 by means of a holder 14 which also holds the sparking plug 3 in position.

The main intake port 7 in the cylinder head 6 is connected with a main intake tube 15 defining therein a main intake passage. The upstream end of the main intake tube 15 is connected with a main carburetor 16 for producing or forming a mixture of gasoline, which is one of the kinds of hydrocarbon fuels, and cleaned air from an air filter 21. The main carburetor 16 is so adjusted as to form a lean air-fuel mixture and provided with a main throttle valve 17 for controlling the flow of the lean air-fuel mixture supplied through the main intake port 7 into the main combustion chamber. On the other hand, the secondary intake port 8 in the cylinder head 6 is connected with a secondary intake tube 18 the upstream end of which is connected with a throttle body 20 having a secondary throttle valve 19 for controlling the flow of the combustible gaseous mixture from a fuel reforming device generally designated by numeral 100 and connected to the upstream end of the throttle body 20. The upstream end of the fuel reforming device 100 is connected with a rich air-fuel mixture producing or forming means in the form of an SU carburetor generally designated by numeral 200. The SU carburetor 200 forms a mixture of gasoline and air and feeds the thus formed air-fuel mixture to the fuel reforming device 100. In the illustrated embodiment, the SU carburetor 200 is so adjusted as to form a rich air-fuel mixture of an air-to-fuel ratio which is less than that of an ordinary air-fuel mixture; namely, less than 10. The passages in the secondary intake tube 18 connected to the secondary intake port 8, in the throttle body 20 and in the fuel reforming device 100 form a secondary intake passage for introducing the combustible gaseous mixture into the secondary intake port 8. The secondary intake passage is particularly designed to extend substantially horizontally for the reason to be made apparent later. The main and the secondary throttle valves 17 and 19 are operatively associated with an acceleration pedal of an associated automobile by means of a link mechanism (not shown).

The details of the fuel reforming device 100 and the SU carburetor 200 will now be described hereunder mainly with reference to FIG. 2. The fuel reforming device 100 comprises a combustion reaction section 100A and a catalytic reaction section 100B. The combustion reaction section 100A comprises a combustion reaction barrel which includes a cylindrical inner tube 102 and an upstream and a downstream flanges 103 and 104 secured together by bolts 101 (only one of which is shown) extending through one of the flanges 104 and screwed into the other flange 103. The inner tube 102 defines therein a horizontal passage which is a part of the afore-mentioned secondary intake passage. The passage defined in the combustion reaction barrel is divided into an upper and a lower sub-passages 106 and 107 by a horizontal dividing wall 105 which includes a substantially central point of the cross-section of the barrel, as also shown in FIG. 3A which is a cross-section of the barrel taken along line IIIA—IIIA in FIG. 2.

A second sparking plug 108 used for fuel reforming purpose is secrewed into a holder 109 which is secured to the inner tube 102. The sparking plug 108 has a high voltage side center electrode 108a extending from the inner end of the body of the plug 108 into the upper sub-passage 106 at a substantially axial intermediate position thereof, as will be seen in FIG. 2. An earthed electrode 108b is mounted on the dividing wall 105 and positioned in opposed relationship to the center electrode 108a. The sparking plug 108 is electrically connected to a conventional ignition system (not shown) so that the plug is electrically energized to intermittently produce spark discharges between the electrodes 108a and 108b.

The dividing wall 105 extends substantially the entire axial dimension of the passage defined in the combustion reaction barrel to thereby axially divide the entire length of the passage into the upper and the lower sub-passages 106 and 107. In the embodiment illustrated in FIGS. 2 and 3A, the dividing wall 105 is substantially flat and divides the passage into two sub-passages having substantially the same cross-sectional areas. The ratio between the cross-sectional areas of the upper and the lower sub-passages 106 and 107 is appropriately determined such that the part of the air-fuel mixture flowing into and through the upper sub-passage 106 is of an air-fuel ratio which is proper for combustion in terms of stoichiometry. The cross-sectional shape of the dividing wall 105 is not limited to the flat shape and may be modified into the shapes as shown in FIGS. 3B and 3C. The modification shown in FIG. 3B comprises a dividing wall 105' which is circular in cross-section (thus, the lower passage 107 is circular) and disposed such that the circle is tangential to the inner peripheral surface of the inner tube 102. The modification shown in FIG. 3C comprises a dividing wall 105'' which is arcuate in cross-section.

Figure 4B:
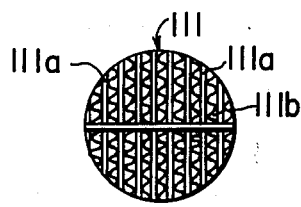
FIG. 4B is a front elevational view of a modification of a flame arresting and heat exchanger member shown in FIG. 4A.
Figure 4A:
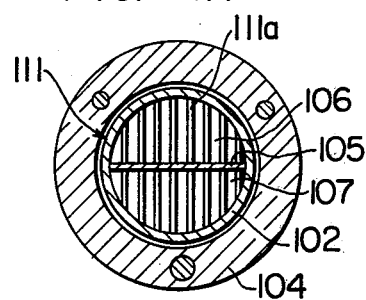
FIG. 4A is a cross-sectional view of the combustion reaction section taken along line IVA—IVA in FIG. 2.

At the upstream and the downstream ends of the upper and the lower sub-passages 106 and 107 are provided with flame arresting members 110 and 111, respectively, which are designed in principle to prevent propagation of flames upstream and downstream of the combustion reaction section 100A and may be made of laminations of a plurality of layers of wire screens or honeycomb structures of a metal or a ceramic material. The downstream flame arresting member 111, however, is advantageously designed to also act as a heat exchanger which exchanges heat between the upper and the lower sub-passages 106 and 107. More specifically, the heat exchanger transfers heat from the upper sub-passage 106 to the lower sub-passage 107. In the illustrated embodiment of the invention, the downstream flame arresting member 111 is formed of a row of a plurality of sheets 111a of a metal having a good heat conductivity, such as a stainless steel, for example, The sheets 111a are arranged in spaced relationship with respect to each other and extend vertically and axially of the inner tube 102, as shown in FIG. 4A. The flame arresting and heat exchanger member 111 operates to prevent flames from being propagated out of the upper sub-passage 106. In addition, those parts of the sheets 111a of the member 111 which are disposed within the upper sub-passage 106 also serve as heat receiving plates for receiving heat from the upper sub-passage 106, while those parts of the sheets 111a which are disposed within the lower sub-passage 107 function as heat radiating plates which receive heat from the upper heat receiving plates and radiate the thus received heat into the lower sub-passage 107. In the modification shown in FIG. 4B, the flame arresting and heat exchanger member 111 includes corrugated fins 111b each disposed between each adjacent pair of the sheets 111a to advantageously improve the efficiency of the above-described heat exchange.

Referring again to FIGS. 2 and 3A, the combustion reaction barrel of the combustion reaction section 100A further includes an outer tube 112 defining with the inner tube 102 an annular space which is filled with a layer of a conventional heat insulating material 113 to keep the interior of the inner tube 102 at an elevated temperature. The heat insulating material 113 may, for example, be asbestos or glass fiber.

The catalytic reaction section 100b comprises a reactor vessel 120 defining therein an axial passage 121 which is communicated with both of the upper and the lower sub-passages 106 and 107 in the combustion reaction barrel and which forms a part of the aforementioned secondary intake passage. The reactor vessel 120 includes an axially intermediate bulged portion 120a within which is disposed a catalyst bed 122 extending transversely across the interior of the bulged portion 120a. The portions of the reactor vessel 120 axially adjacent to the bulged portion 120 gradually converge toward the ends of the reactor vessel and terminate in an upstream and a downstream flanges 120b and 120c, respectively. The upstream flange 120b is secured by bolts 123a and 123b to the downstream flange 104 of the combustion reaction barrel, while the downstream flange 120c is secured by bolts 124a and 124b to the throttle body 20. The reactor vessel 120 is preferably formed of a pair of an upper and a lower halves 120' and 120" (FIG. 5A) to make easy the installation of the catalyst bed 122 in the bulged portion 120a.

Figure 5A:
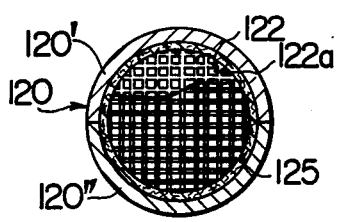
FIG. 5A is a cross-sectional view of a catalytic reaction section of the system taken along line FIG. VA—VA in FIG. 2.
Figure 5B:
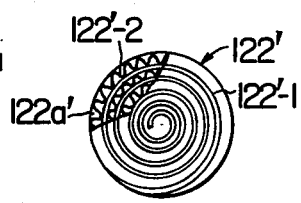
FIGS. 5B and 5C are front elevational views of modifications of a catalyst bed shown in FIG. 5A.
Figure 5C:
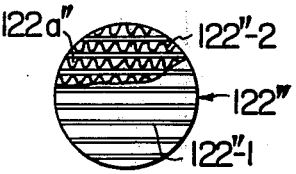

As shown in FIG. 5A, the catalyst bed 122 is formed into a honeycomb structure which defines therein a plurality of passages 122a of substantially square cross-sections and carries thereon a catalyst. The catalyst bed 122 is disposed in the passage 121 with an annular shock absorbing member 125 of a mass of fine wires of a heat-resistant metal interposed between the catalyst bed 122 and the reactor vessel 120. The main component of the catalyst carried by the catalyst bed 122 is nickel or silver. Alternatively, the catalyst may be one which contains platinum or rhodium. The catalyst bed 122 is not limited to the structure shown in FIG. 5A. FIG. 5B shows a modification which comprises a catalyst bed 122' which is formed of a spiral convolution 122'-1 of a heat-resistant sheet material and a heat resistant corrugated sheet material 122'-2 interposed between each adjacent turns of the convolution. The gaps between each turn of the convolution and the corrugated sheet form a plurality of passages 122a'. FIG. 5C shows another modification which comprises a lamination of a plurality of flat and heat-resistant sheet materials 122"-1, and a plurality of heat-resistant and corrugated sheet materials 122"-2 which are alternately disposed to provide a plurality of passages 122a" between each corrugated sheet 122"-2 and adjacent flat sheets 122"-1. FIGS. 7A and 7B show a further modification of the catalyst bed. The further modification comprises a pair of axially spaced end plates 128 and 129 extending across the passage 121 in the reactor vessel 120, each of which is formed of a perforated sheet metal or wire screen and a layer of catalyst particles 130 disposed in the space between the perforated end plates 128 and 129.

Figure 2:
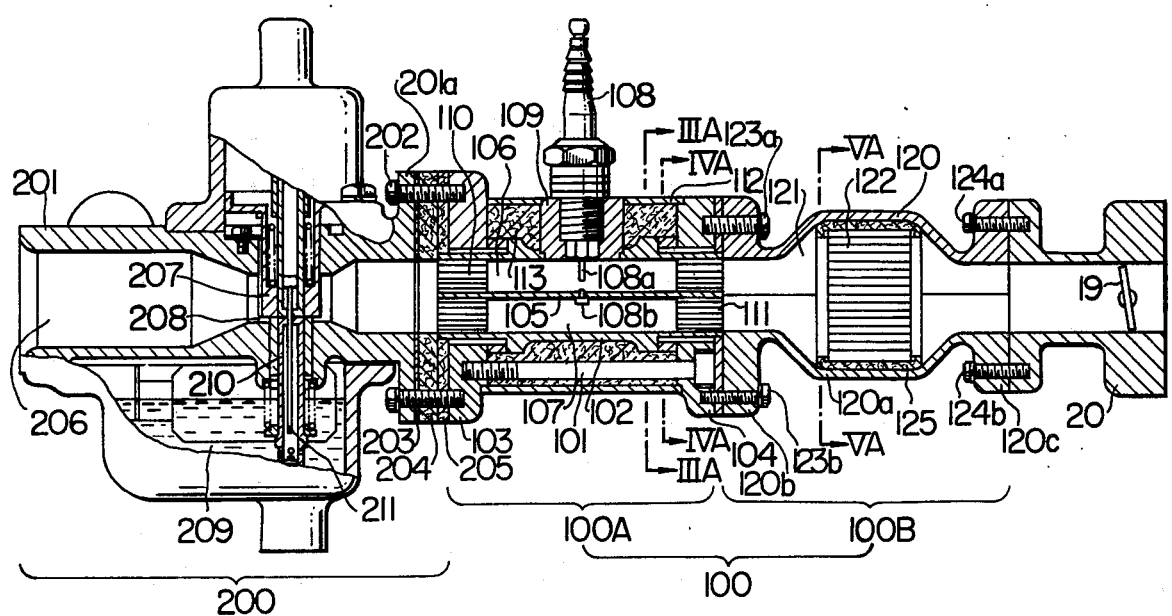
FIG. 2 is a fragmentary sectional side view of the fuel reforming system.
Figure 3A:
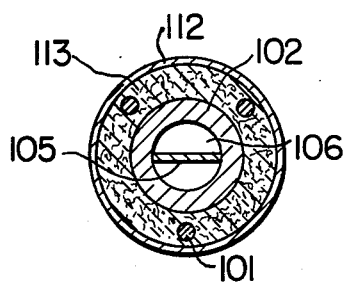
FIG. 3A is a cross-sectional view of a combustion reaction section of the system taken along line IIIA—IIIA in FIG. 2.
Figure 3B:
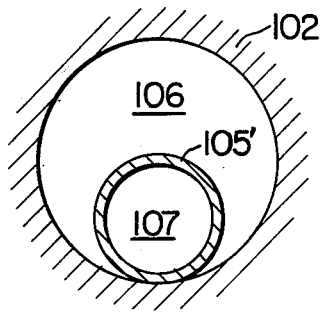
FIGS. 3B and 3C are enlarged fragmentary sectional views illustrating modifications of a dividing wall shown in FIGS. 2 and 3A.
Figure 3C:
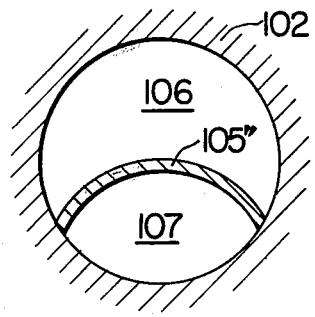
Figure 6A:
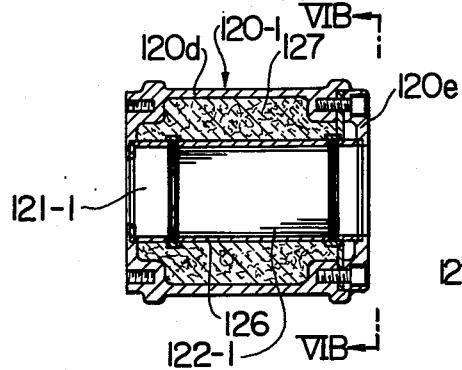
FIG. 6A is an axially sectional side elevational view of a modification of the catalytic reaction section shown in FIG. 2.
Figure 6B:
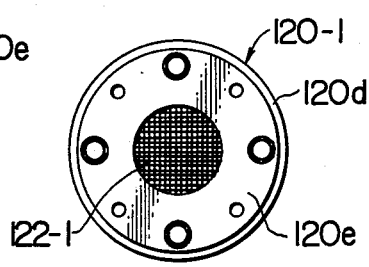
FIG. 6B is an end view of the modified catalytic reaction section shown in FIG. 6A as viewed from line VIB—VIB in FIG. 6A.

FIGS. 6A and 6B show a modification of the structure of the catalytic reaction section 100B shown in FIG. 2. The modification comprises a reactor vessel 120-1, an inner tube 126 defining a passage 121-1 therein, a catalyst bed 122-1 of a honeycomb structure disposed in the passage 121-1, a layer 127 of a heat insulating material such as asbestos or glass fiber disposed between the inner tube 126 and the reactor vessel 120-1 to keep the interior of the inner tube at an elevated temperature. The reactor vessel 120-1 is preferably formed of a generally pot-like housing member 120d and an end plate 120e secured to the open end of the housing member 120d. This structure of the reactor vessel 120-1 is convenient for the assembly of parts into the catalytic reaction section 100B. The bottom end of the pot-like housing member 120d and the end plate 120e are formed therein with openings which are axially aligned with each other and with the passage 121-1.

Referring again to FIG. 2, the SU carburetor 200 is of a variable venturi type, as well known in the art, and comprises a carburetor body 201 having a downstream flange 201a secured by bolts 202 to the upstream flange 103 of the combustion reaction section 100A. Three gaskets 203, 204 and 205 each made of a heat insulating material are interposed between the flanges 201a and 103 to prevent transfer of heat from the fuel reforming device 100 to the carburetor 200. The structure of the SU carburetor is well known in the art. Thus, the carburetor 200 will be briefly described hereunder. The carburetor body 201 defines therein an air passage 206 which is communicated with the upper and the lower sub-passages 106 and 107 in the combustion reaction section 100A of the fuel reforming device 100. A suction piston 207 is mounted on the carburetor body 201 so that the piston 207 extends into the air passage 206 in a transverse direction of the air passage 206 and is movable up and down according to a pressure difference across the piston to form a variable venturi 208. A fuel nozzle 210 is mounted in the carburetor body 201 at the lower side thereof and positioned in substantially coaxial relationship to the suction piston 207. The fuel nozzle 210 has a fuel jetting orifice opening to the variable venturi 208 and a bottom end extending into a flat chamber 209 in which gasoline supplied from a fuel tank (not shown) by a fuel pump (not shown) is maintained at a constant liquid level. A needle 211 is secured to the suction piston 207 and slidably extends into the fuel nozzle 210 to meter the flow of gasoline from the float chamber 209 to the venturi 208.

In the case where the engine described has a plurality of cylinders, the main and secondary intake passages are respectively divided at the main and secondary intake tubes 15 and 18 into a plurality of branches each connected to one of the cylinders.

In operation, the SU carburetor 200 operates to form or produce in conventional manner a rich mixture of fuel (gasoline) and air at an air-to-fuel ratio of less than 10. The production of the rich air-fuel mixture is performed in such a manner that the fuel is jetted from the fuel nozzle 210 into the venturi 208 at a rate according to the rate of flow of air through the air passage 206 with the result that the jetted fuel is formed into fine particles which are mixed with the air flowing through the venturi 208. With the SU carburetor, air and fuel are not perfectly uniformly mixed. Because of the difference in the gravity between air and fuel and because of the positioning of the fuel nozzle 210, the part of the produced air-fuel mixture nearer to the lower part of the inner peripheral surface of the passage 206 contains a greater percentage of fuel compared with the part of the mixture nearer to the upper part of the inner peripheral surface of the passage. This stratified distribution of the fuel is maintained as far as the intake passage following the SU carburetor 200 extends in substantially horizontal direction. Due to the stratified distribution of the fuel particles in the air, the lower sub-passage 107 in the fuel reforming device 100 receives the relatively rich part of the rich air-fuel mixture, which part of the mixture is richer than what is called "rich air-fuel mixture" in the present application, while the upper sub-passage 106 in the fuel reforming device 100 receives the relatively lean part of the air-fuel mixture, which part of the mixture is of an air-fuel ratio within the combustible range. The lean, combustible part of the rich air-fuel mixture is ignited by the sparking plug 108 and burnt within the upper sub-passage 106. The flame arresting members 110 and 111 prevent upstream and downstream propagation of flames produced by the combustion. It will be appreciated that no extra supply of secondary air is necessary for the combustion of the lean part of the rich air-fuel mixture. The combustion produces heat which is transferred through the dividing wall 105 and the downstream flame arresting and heat exchanger member 111 to the rich part of the rich air-fuel mixture flowing through the lower sub-passage 107, with the result that the rich part of the rich air-fuel mixture is surely atomized and that a portion of the rich part of the mixture is subjected to thermal decomposition and converted into a reformed gaseous mixture which contains hydrogen. Thereafter, the rich part of the mixture (which is now composed of the fully atomized part of the fuel and the partially reformed gaseous mixture) from the lower sub-passage 107 and the combustion products or burned gases from the upper sub-passage 106 enter the passage 121 in the catalytic reaction 100B and are mixed in the passage 121 so that the thermal decomposition and, especially, atomization of the fuel are facilitated and so that either oxidation combustion reaction or reduction reaction of a part of the fuel is induced. Thus, a part of the fuel contained in the rich air-fuel mixture is effectively converted into a reformed gaseous mixture, while the remainder of the fuel is fully atomized and prepared for a catalytic reforming reaction in the catalyst bed 122, as will be described later.

The reformation of the fuel by virtue of the combustion of a part of the air-fuel mixture produced by the SU carburetor 200 is achieved by keeping the lean air-fuel mixture part (i.e., the mixture part flowing into the upper sub-passage 106) within a proper range of air-fuel ratio and by surely igniting the lean air-fuel mixture part by the sparking plug 108. In order to obtain a high degree of reformation, the heat produced in the upper sub-passage 106 should be effectively transferred to the rich part of the air-fuel mixture flowing into and through the lower sub-passage 107.

With the fuel reforming system according to the present invention described above, the horizontal passage in the combustion reaction section 100A is divided by the dividing wall 105 into upper and lower sub-passages. The ratio between the cross-sectional areas of the upper and the lower sub-passages 106 and 107 is properly determined so that due to the difference in gravity between fuel and air, the upper sub-passage 106 is supplied with an air-fuel mixture within a properly combustible range of air-to-fuel ratio. It will be appreciated that by simply dividing the horizontal passage in the combustion reaction section 100A by means of the simple dividing wall 105, the relatively lean, combustible part of the rich air-fuel mixture produced by the SU carburetor 200 can be separated from the relatively rich, noncombustible part of the mixture. The inherent construction of the SU carburetor partly contributes to the separation of the lean and rich parts of the rich air-fuel mixture and assures that the air-fuel mixture is reliably divided into the lean and rich parts. In addition, it is to be particularly noted that not only the combustion reaction section 100A but also the catalytic reaction section 100B are positioned upstream of the throttle valve 19. In general, the vacuum downstream of the throttle valve 19 is greatly varied according to the operating conditions of the engine. By the presence of the throttle valve 19, however, the variation of the vacuum is hardly transmitted upstream of the throttle valve 19, so that the combustion reaction section 100A as well as the catalytic reaction section 100B are protected from the pressure variation which would otherwise adversely affect not only the ignition of the combustible lean part of the rich air-fuel mixture by the sparking plug 108 but also the fuel reforming operation in the catalyst bed, whereby reliable reformation is continuously attained. Moreover, the efficiency of the reformation is improved by the fact that the heat produced in the upper sub-passage 106 is effectively transmitted by the dividing wall 105 and the downstream flame arresting and heat exchanger member 111 to the rich part of the mixture flowing through the lower sub-passage 107. The heat insulating material 113 surrounding the inner tube 102 of the combustion reaction section 100A prevents outward radiation of the heat produced within the upper sub-passage 106 with the resultant improvements in the heat transfer from the upper passage 106 to the rich part of the air-fuel mixture in the lower sub-passage 107 and, thus, in the efficiency of the reformation.

In the case where the lean part of the air-fuel mixture flowing into the upper sub-passage 106 is at a stoichiometric equivalence ratio (i.e., stoichiometric ratio of oxygen required for complete combustion of a fuel relative to total oxygen present) of less than 1, the combustion of the lean mixture part tends to produce soot. The production of soot can be prevented by adjusting the system such that the lean mixture part entering the upper sub-passage 106 is at an equivalence ratio of more than 1.

The composite mixture of the reformed gaseous mixture and the fully atomized part of the fuel produced in the combustion reaction section 100A and in the passage 121 is introduced into the catalyst bed 122 while the composite mixture is maintained at a high temperature and in a gasified condition. Thus, even if the catalyst bed 122 is at a low temperature as experienced at the cold-starting of the engine, the catalyst bed 122 is quickly warmed and the catalyst carried by the bed becomes activated. The activated catalyst facilitates a reformation of the fully atomized part of the fuel in a manner similar to that of the above-described reformation in the combustion reaction section 100A and the passage 121. Because the catalyst bed 122 is disposed upstream of the throttle valve 19 and, thus, is hardly subjected to the pressure variation, the reformation by the action of the catalyst is reliably achieved.

The fuel flowing out of the fuel reforming device 100 is completely converted into a reformed gaseous mixture the main component of which is hydrogen. When the intake valve 9 is opened, the reformed gaseous mixture flows through the throttle body 20, the secondary intake tube 18, the secondary intake port 8, a part of the main combustion chamber 1 and through the suction aperture 11 into the trap chamber 2 and is trapped therein. On the other hand, the main combustion chamber 1 is supplied with a lean air-fuel mixture from the main carburetor 16 and through the main intake pipe 15 and the main intake port 7 in the cylinder head 6. The total charge of the air-fuel mixture supplied to the trap chamber 2 and the main combustion chamber 1, is very lean. The fuel supplied into the trap chamber consists of the completely gasified and reformed gaseous mixture. This is advantageous in the case where the engine has a plurality of cylinders in that the completely gasified mixture can be uniformly distributed into the respective cylinders. In addition, hydrogen and the completely gasified fuel extremely improve the ignitability and combustibility to attain an extremely reliable combustion of the fuel at a very lean air-to-fuel ratio, whereby the purification of the engine exhaust gases is effectively realized. By the above-described reformation, a fuel of a low octane value can be converted into a fuel of a high octane value. Thus, even if a fuel of a low octane value is used for the engine, the performance of the engine thus obtained from the fuel is substantially the same as the engine performance obtained from the use of a fuel of a higher octane value. Thus, the system of the present invention enables the engine to be supplied with a fuel of high octane value converted from that of low octane value and also prevents the emission of harmful components of exhaust gases produced by the use of such fuel of high octane value.

FIG. 8 shows a modification of the combustion reaction section 100A shown in FIG. 2. The modification comprises a barrel 102' provided with integral flanges 102'a and 102'b at the upstream and the downstream ends of the barrel. The interior of the barrel 102' is divided by a dividing wall 105 into an upper and a lower sub-passages 106 and 107. Upstream and downstream flame arresting members 110' and 111' are provided in the upper sub-passage 106 respectively at the upstream and the downstream ends thereof. A sparking plug 108 is mounted directly on the barrel 102' so that a center electrode 108a projects into the upper sub-passage 106. An earthed electrode 108b is mounted on the dividing wall 105 in opposite relationship to the electrode 108a. The entire length of the lower sub-passage 107 accomodates a heat exchanger member 111'a which is formed therein with a plurality of axial passage and which may be similar in structure to the flame arresting and heat exchanger member 111 shown either in FIG. 4A or in FIG. 4B. As will be seen in FIG. 8, the heat exchanger member 111'a is disposed in heat transfer relationship with the dividing wall 105.

The barrel 102' is connected at its upstream end to the SU carburetor 200 and supplied with a rich mixture of air and a fuel produced thereby. As discussed previously, the rich air-fuel mixture is divided into a relatively lean mixture part of an air-to-fuel ratio within a combustible range and rich mixture part which is richer than what is called "rich air-fuel mixture" in the present application. The lean mixture part is introduced into the upper sub-passage 106 for the ignition by the sparking plug 108, whereas the rich mixture part is fed into the lower sub-passage 107. The heat produced by the combustion in the upper sub-passage 106 is transferred through the dividing wall 105 and the heat exchanger member 111'a to the rich mixture part in the lower sub-passage 107, so that the rich mixture part is processed in a manner similar to that described with reference to FIG. 2.

FIG. 9 illustrates another embodiment to the present invention. This embodiment comprises a carburetor 300 of a down draft and variable venturi type. The carburetor 300 includes a barrel 301 defining therein a passage 306 in which is pivotally mounted an air valve 307 which is operable to automatically open and close the passage 306 in accordance with a pressure difference across the air valve by a conventional vacuum-operated mechanism 308, thus controlling the flow of air through the passage 306. Thus, the carbuetor 300 may also be called "air valve type carburetor". A fuel nozzle 310 having a fuel orifice 311 open to the passage 306 just downstream of the air valve 307 extends from the barrel 301 into a float chamber 309 provided on one side of the barrel 301. The part of the carburetor barrel 301 downstream of the air valve 307 and fuel orifice 311 is formed into a combustion reaction section 400A of a fuel reforming device 400. More specifically, a dividing wall 405 is provided in the part of the passage 306 positioned downstream of the air valve 307 and the fuel orifice 311 to divide the passage part into sub-passages 406 and 407. The sub-passage 406 is positioned adjacent to that side of the inner peripheral surface of the barrel 301 which is substantially diametrically opposite to the fuel orifice 311, while the sub-passage 407 is positioned on the same side of the barrel as the fuel orifice 311. The sub-passage 406 is provided with flame arresting members 410 and 411 disposed at substantially an upstream and a downstream ends of the sub-passage 406. A sparking plug 408 is mounted on the carburetor barrel 301 so that a set of electrodes of the plug is disposed within the sub-passage 406 between the flame arresting members 410 and 411. The downstream ends of the sub-passages 406 and 407 are connected to a passage 421 extending through a catalytic reaction section 400B which may be similar in structure to the catalytic reaction section 100B described previously.

With the embodiment shown in FIG. 9, the fuel jetted into the passage 306 is not immediately uniformly mixed with air. A relatively rich part of the air-fuel mixture is formed at the place adjacent to the fuel orifice 311, whereas a relatively lean part of the air-fuel mixture of a combustible air-fuel ratio is produced at the place remote from and diametrically opposite to the orifice 311. The lean mixture part is thus introduced into the sub-passage 406 and ignited by the sparking plug 408. The operation of the combustion reaction section 400A is similar to that of the combustion reaction section 100A and, thus, will not be described. The catalytic reaction section 400B also operates in a manner similar to that of the catalytic reaction section 100B. Thus, it will not be necessary to further describe the operation of the catalytic reaction section.

Thus, the fuel from the fuel nozzle 310 is converted into a hydrogen-containing reformed gaseous mixture to be introduced into the trap chamber 2 and trapped in the vicinity of the sparking plug 3 of the engine. The existence of hydrogen in the reformed gaseous mixture greatly improves the ignitability of the fuel by the sparking plug 3. In addition, a relatively small amount of the reformed gaseous mixture is sufficient for the torch ignition of the lean air-fuel mixture introduced into the main combustion chamber. For this reason, the fuel reforming system itself can be designed to have a small size and thus conveniently installed in a narrow engine compartment of an associated automobile.

As having been described, the reformation of a fuel by the fuel reforming system of the present invention is achieved by the principle that a passage following the rich-mixture producing carburetor is divided into two sub-passages one of which is provided with a sparking plug and which is designed to receive a combustible, lean part of the rich air-fuel mixture for the ignition by the sparking plug, the other sub-passage being designed to receive a non-combustible, rich part of the rich air-fuel mixture, and that the two divided sub-passages are both connected to the catalytic reaction section having a catalyst bed therein. For this reason, the installation of the heat exchanger member 111 or 111′a in the combustion reaction section 100A and the provision of the heat insulating layer 113 around the inner tube 102 are not indispensable for the invention, although they are useful and improve the reforming operation of the system. It is also to be noted that the means for producing the rich air-fuel mixture are not limited to the SU carburetor 200 or the down draft, air-valve type carburetor 300 and may be any conventional rich air-fuel producing means such as a fuel injection device. In the described embodiments of the invention, gasoline is used as the fuel to be converted into the reformed gaseous mixture. However, other hydrocarbon fuels, such as alcohols (methyl alcohol is most preferred), may also be used with the system of the present invention. In the case where methyl alcohol is used, the air-to-methyl alcohol ratio should be less than 2. The engine associated with the fuel reforming system of the present invention has been described as being of the type that has a sub-combustion chamber in the form of a trap chamber 2 and a single intake valve 9 operated to open and close the main and secondary intake ports 7 and 8. However, the engine may be of another type having another type of sub-combustion chamber; i.e., having a secondary intake port and a secondary intake valve which is solely used to control the communication between the secondary intake port and the sub-combustion chamber.

The fuel reforming system described above may be associated not only with a torch ignition type internal combustion engine, such as one described above, but also with an ordinary type internal combustion engine adapted to be operated by a homogeneous air-fuel mixture (not by stratified charges of mixtures). In addition, the reformed gaseous mixture produced by the fuel reforming system described above may be mixed with air or air-fuel mixture before the reformed gaseous mixture is fed into the engine.

What is claimed is:

1. A fuel reforming system for converting a rich mixture of air and a fuel into a reformed gaseous mixture containing hydrogen and for feeding the reformed gaseous mixture into a combustion chamber of an internal combustion engine, comprising:
   an air-valve type carburetor for producing a heterogeneous rich mixture of air and fuel;
   means disposed downstream of said carburetor for defining an intake passage leading to a combustion chamber of an internal combustion engine;
   means disposed in said intake passage directly downstream of said carburetor for dividing a part of said intake passage into first and a second sub-passages to introduce a relatively lean part of said heterogeneous rich mixture into said first sub-passage and introduce a relatively rich part of said heterogeneous rich mixture into said second sub-passage;
   igniting means extending into said first sub-passage for igniting and burning said relatively lean part of said mixture to produce heat in said first sub-passage, said heat being transferred to said second sub-passage to heat said relatively rich part of said mixture flowing therethrough;
   the burned gas from said first sub-passage and said relatively rich part of said mixture from said second sub-passage being mixed together downstream of said dividing means to facilitate atomization of said mixture;
   catalyst means disposed in said intake passage downstream of said dividing means for converting the heated and atomized mixture into reformed gaseous mixture; and
   a throttle valve disposed in said intake passage downstream of said catalyst means for varying the cross-sectional area of said intake passage.

2. A fuel reforming system according to claim 1, wherein said rich mixture producing means produce a rich mixture of air and gasoline at an air-to-fuel ratio of less than 10.

3. A fuel reforming system according to claim 1, wherein said carburetor comprises; an air valve automatically operative to control the cross-sectional area of said intake passage according to a pressure difference across said air valve to thereby control the flow of air therethrough; and a fuel nozzle having a fuel orifice open to said intake passage immediately downstream of said air valve.

4. A fuel reforming system according to claim 1, wherein said carburetor is an SU carburetor and wherein said divided part of said intake passage extends substantially horizontally so that said first sub-passage is disposed substantially vertically above said second sub-passage, said rich air-fuel mixture being vertically separated into relatively lean and rich parts by virtue of the difference in gravity between air and the fuel so that said relatively lean part of said rich air-fuel mixture is introduced into said first sub-passage.

5. A fuel reforming system according to claim 1, further including heat exchanger means disposed in said first and second sub-passages substantially at the downstream ends thereof for transferring the heat produced in said first sub-passage to said relatively rich part of said rich air-fuel mixture flowing through said second sub-passage.

6. A fuel reforming system according to claim 1, further including flame arresting means respectively disposed substantially at the upstream and the downstream ends of said divided part of said intake passage for preventing upstream and downstream propagation of flames produced by the combustion of said relatively lean air-fuel mixture part, the downstream flame arresting means being designed to also act as a heat exchanger which disposes said first and second sub-passages in heat exchange relationship.

7. A fuel reforming system according to claim 1, further including a layer of a heat insulating material surrounding the part of said intake passage defining means in which said divided part of said intake passage is disposed.

8. A fuel reforming system according to claim 1, further including a layer of heat insulating material surrounding the part of said intake passage defining means in which said catalyst means is disposed.

9. A fuel reforming system for converting a rich mixture of air and a fuel into a reformed gaseous mixture containing hydrogen, said system being adapted for use with an internal combustion engine of the type comprising a cylinder, a cylinder head cooperating with said cylinder to define a main combustion chamber, a main intake port for introducing a lean mixture of air and a fuel to said main combustion chamber, a sub-combustion chamber communicated with said main combustion chamber, a sparking plug having a set of electrodes disposed in said sub-combustion chamber, a secondary intake port for supplying said sub-combustion chamber with the reformed gaseous mixture, said system comprising:

an air-valve type carburetor for producing the rich mixture of air and the fuel, means disposed downstream of said carburetor and defining a secondary intake passage adapted to be connected at its downstream end to said secondary intake port of said engine, means disposed in said secondary intake passage directly downstream of said carburetor for dividing a part of said secondary intake passage into first and second sub-passages, said first sub-passage being adapted to receive a relatively lean part of said rich air-fuel mixture while said second sub-passage is adapted to receive a relatively rich part of said rich air-fuel mixture, a second sparking plug having at least one electrode extending into said first sub-passage for igniting and burning said relatively lean part of said rich air-fuel mixture to thereby produce heat in said first sub-passage, a catalyst means disposed in said secondary intake passage downstream of said dividing means, and a secondary throttle valve disposed in said secondary intake passage downstream of said catalyst means for varying the cross-sectional area of said secondary intake passage.

10. A fuel reforming system for converting a rich mixture of air and a fuel into a reformed gaseous mixture containing hydrogen, said system being adapted for use with an internal combustion engine of the type comprising a cylinder, a cylinder heat cooperating with said cylinder to define a main combustion chamber, an intake valve having a valve stem and a valve head connected thereto, a main intake port for introducing a lean mixture of air and a fuel into said main combustion chamber, a substantially closed trap chamber having at least one suction aperture and at least one discharge aperture, said suction and discharge apertures communicating the interior of said trap chamber with said main combustion chamber, means disposed in said trap chamber between said suction and discharge apertures for partially dividing the interior of said trap chamber, a secondary intake port for supplying said trap chamber with the reformed gaseous mixture, said secondary intake port having a downstream end opening in the downstream end of said main intake port and oriented generally toward said suction aperture of said trap chamber so that the reformed gaseous mixture is directed from said open downstream end of said secondary intake port into said trap chamber, said system comprising:

an SU carburetor for producing the rich mixture of air and the fuel, means disposed downstream of said SU carburetor and defining a secondary intake passage adapted to be connected at its downstream end to said secondary intake port of said engine, means disposed in said secondary intake passage directly downstream of said carburetor for dividing a part of said secondary intake passage into first and second sub-passages, the rich air-fuel mixture produced by said SU carburetor being vertically separated into relatively lean and rich parts by virtue of the difference in gravity between air and fuel, said divided part of said secondary intake passage extending substantially horizontally so that said first sub-passage is disposed substantially vertically above said second sub-passage to receive said relatively lean part of said rich air-fuel mixture, a second sparking plug having at least one electrode extending into said first sub-passage for igniting and burning said relatively lean part of said rich air-fuel mixture to thereby produce heat in said first sub-passage, catalyst means disposed in said secondary intake passage downstream of said dividing means, and a secondary throttle valve disposed in said secondary intake passage downstream of said catalyst means for varying the cross-sectional area of said secondary intake passage.

* * * * *